(12) United States Patent
Chen

(10) Patent No.: US 8,622,733 B2
(45) Date of Patent: Jan. 7, 2014

(54) EJECTION MECHANISM AND MOLD USING THE SAME

(75) Inventor: Hsiang-Hung Chen, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 389 days.

(21) Appl. No.: 13/083,601

(22) Filed: Apr. 11, 2011

(65) Prior Publication Data

US 2011/0256259 A1 Oct. 20, 2011

(30) Foreign Application Priority Data

Apr. 15, 2010 (TW) .............................. 99111880 A

(51) Int. Cl.
*B29C 45/44* (2006.01)

(52) U.S. Cl.
USPC ............................ 425/556; 425/444; 425/577

(58) Field of Classification Search
USPC ............................ 425/444, 556, 577; 264/334
See application file for complete search history.

(56) References Cited

U.S. PATENT DOCUMENTS

| | | | | |
|---|---|---|---|---|
| 5,310,331 A * | 5/1994 | Wakebe et al. | ............... | 425/139 |
| 5,417,560 A * | 5/1995 | Kaneishi et al. | .......... | 425/192 R |
| 6,113,376 A * | 9/2000 | Eppich | ........................... | 425/190 |
| 6,616,872 B2 * | 9/2003 | Kamiguchi et al. | ......... | 264/40.1 |
| 6,655,949 B2 * | 12/2003 | Chikazawa et al. | ............ | 425/190 |
| 7,275,922 B2 * | 10/2007 | Uchiyama et al. | ............ | 425/139 |
| 8,002,532 B2 * | 8/2011 | Stirn et al. | ..................... | 425/139 |
| 8,057,216 B2 * | 11/2011 | Jang et al. | ..................... | 425/441 |
| 8,444,409 B2 * | 5/2013 | Eppich | ........................... | 425/444 |
| 8,449,286 B2 * | 5/2013 | Huang | ........................... | 425/556 |
| 2010/0055228 A1 * | 3/2010 | Jang et al. | ..................... | 425/556 |
| 2011/0064843 A1 * | 3/2011 | Eppich | ........................... | 425/556 |
| 2011/0229596 A1 * | 9/2011 | Huang | ........................... | 425/556 |
| 2011/0256258 A1 * | 10/2011 | Kuo | .............................. | 425/556 |
| 2011/0311665 A1 * | 12/2011 | Kimura | .............................. | 425/3 |

* cited by examiner

*Primary Examiner* — Yogendra Gupta
*Assistant Examiner* — Emmanuel S Luk
(74) *Attorney, Agent, or Firm* — Altis Law Group, Inc.

(57) ABSTRACT

An exemplary ejection mechanism includes a first plate and a second plate opposite to the first plate, an ejector plate, ejectors, an actuator with a driving shaft, and a drive mechanism. The ejector plate and the drive mechanism are located between the first plate and the second plate. The ejection mechanism further defines first through holes which pass through the first plate and the second plate. The ejector plate defines a second through hole which is coaxial with the first through holes. The ejector extends from the ejecting plate to the first plate and aligns with the ejector hole of the first plate. The drive mechanism links with the driving shaft and the ejector plate, and the actuator drives the ejector plate between the first plate and the second plate via a drive mechanism, which makes the ejector eject or retract.

11 Claims, 6 Drawing Sheets

EJECTION MECHANISM AND MOLD USING THE SAME

BACKGROUND

1. Technical Field

The present disclosure generally relates to mold technology, and particularly to a mold with an ejection mechanism.

2. Description of the Related Art

Often, in injection molding, an ejection mechanism impels a plate to drive at least one ejector to eject a newly molded article from a mold cavity.

A commonly used ejection mechanism for injection molding is arranged on a movable mold half, moving along the movable mold half to eject the molded article. However, when a molded article or a significant portion of the article is attached to an opposing stationary mold half, ejection of the article can be difficult.

What is needed, therefore, is an ejection mechanism which can improve ejection efficiency and at least ameliorate the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present ejection mechanism. Moreover, in the drawings, like reference numerals designate corresponding parts throughout the views, and all the views are schematic.

DETAILED DESCRIPTION

Embodiments of an ejection mechanism are described in detail hereinbelow with reference to the drawings.

Figure 1:
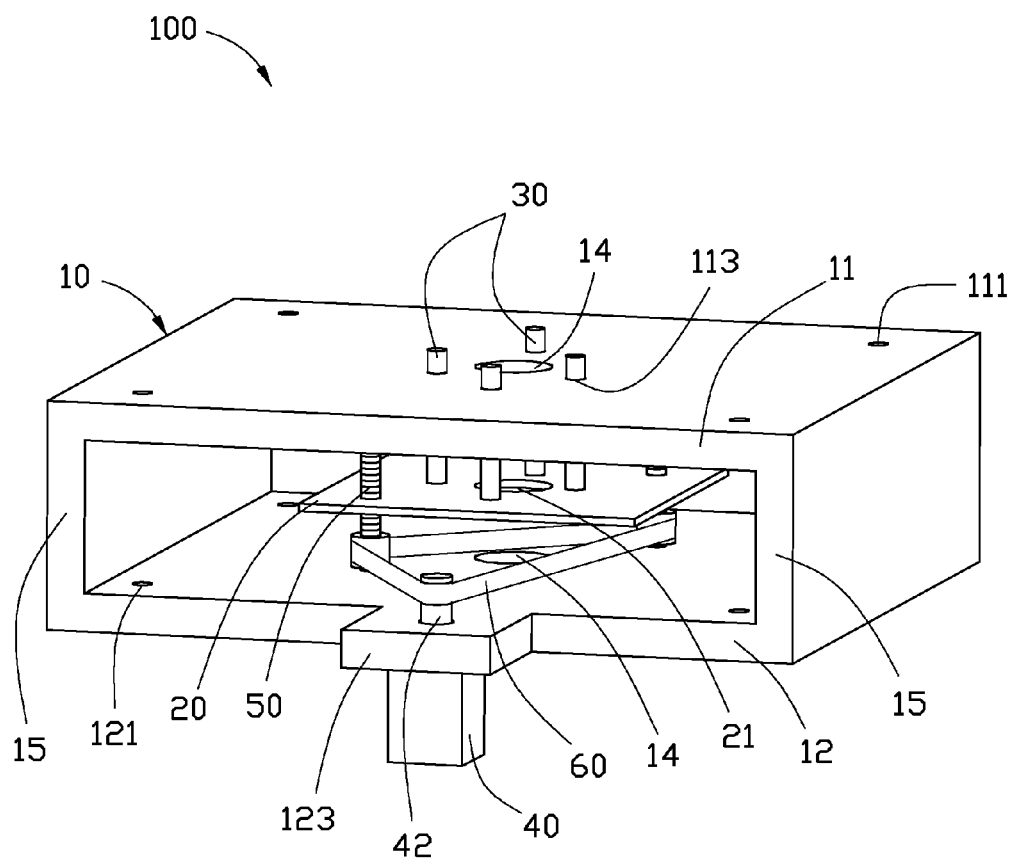
FIG. 1 is an isometric view of an ejection mechanism in accordance with a first embodiment.
Figure 2:
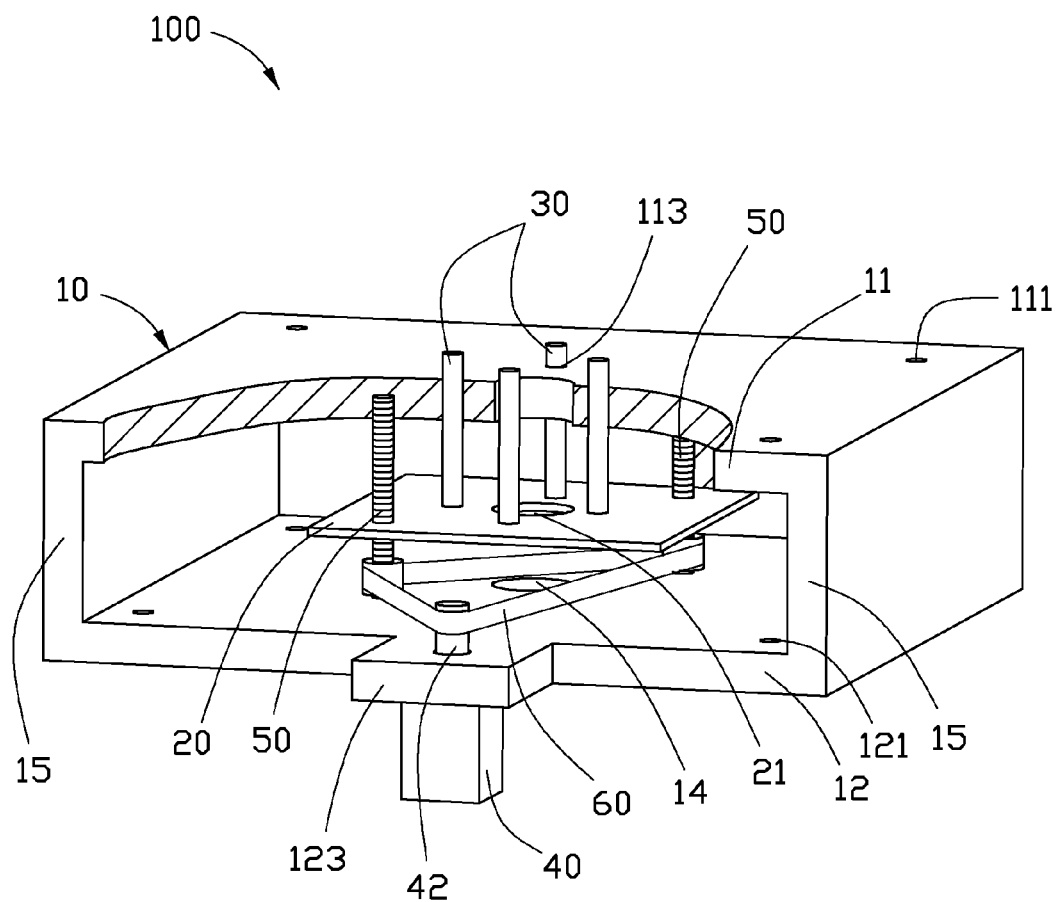
FIG. 2 is a cutaway view of the ejection mechanism shown in FIG. 1.

Referring to FIG. 1 and FIG. 2, an ejection mechanism 100 in accordance with a first embodiment includes a frame 10, an ejector plate 20, four ejectors 30, an actuator 40, and two threaded posts 50. The frame 10 includes a first plate 11, a second plate 12 opposite to the first plate 11, a first through hole 14 defined in the first plate 11, and another first through hole 14 defined in the second plate 12. The two first through holes 14 are coaxial with each other.

Figure 6:
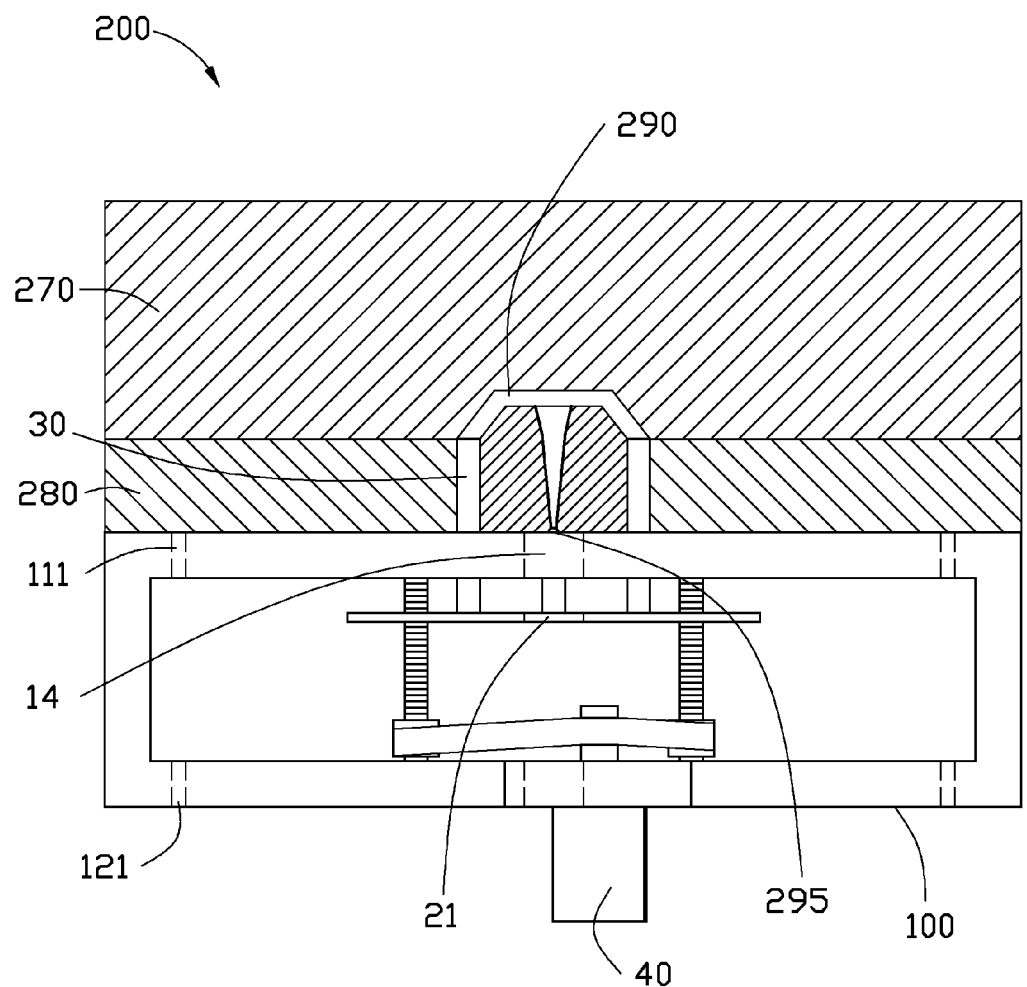
FIG. 6 is a front plan view of a mold comprising the ejection mechanism of FIG. 1, showing the other parts of the mold cut away.

In this embodiment, the first plate 11 and the second plate 12 are both rectangular. Referring also to FIG. 6, the first plate 11 further comprises four first fixing holes 111 arranged at the four corners thereof respectively, for fixing the ejection mechanism 100 on a stationary mold half 280 of a mold 200. The second plate 12 further comprises four second fixing holes 121 arranged at the four corners thereof respectively, for locking the mold 200.

Preferably, the first through holes 14 are arranged at centers of the first and second plates 11, 12, and are aligned with an injection nozzle (not shown). The injection nozzle passes through the first through holes 14 to inject molten plastic into a mold chamber 290 of the mold 200.

The frame 10 further comprises two rectangular connecting plates 15 arranged opposite to each other between the first plate 11 and the second plate 12. The first plate 11, the second plate 12, and the two connecting plates 15 together form the frame 10. The ejector plate 20 is arranged between the first plate 11 and the second plate 12 and moves therebetween.

In this embodiment, the ejector plate 20 is rectangular and parallel to the first plate 11 and the second plate 12. A second through hole 21 is defined in the ejector plate 20, and is coaxial with the first through holes 14. The injection nozzle passing through the first through holes 14 also passes through the second through hole 21.

The four ejectors 30 are arranged on the ejector plate 20 parallel to each other. Each of the four ejectors 30 extends from the ejector plate 20 to the first plate 11, and is slidably received in a corresponding one of the four ejector holes 113 of the first plate 11.

In this embodiment, the actuator 40 is arranged on a protruding plate 123 extending from the edge of the second plate 12. A driving shaft 42 of the actuator 40 passes through the second plate 12, parallel to the ejectors 30. The actuator 40 can be a motor capable of clockwise and anticlockwise rotation.

The two threaded posts 50 are arranged near corners of the ejector plate 20 which are diagonally opposite to each other. The threaded posts 50 are threadedly engaged in the ejector plate 20. One end of each threaded post 50 at the second plate 12 connects with the drive shaft 42 of the actuator 40 through a belt 60. In this embodiment, the two threaded posts 50 and the belt 60 cooperatively form a transmission mechanism connecting the actuator 40 and the ejector plate 20. The end of each threaded post 50 connecting with the drive shaft 42 is rotatably mounted on the second plate 12.

The shape and structure of the ejection mechanism 100 is not limited to that disclosed. For example, the transmission mechanism connecting the actuator 40 and the ejector plate 20 is not limited to the above-described embodiment. The protruding plate 123 can be omitted, and the actuator 40 can instead be arranged on one side of the second plate 12 away from the first plate 11. Alternatively, the actuator 40 can be arranged inside the frame 10 between the first plate 11 and the second plate 12, to reduce the size of the ejection mechanism 100.

Figure 3:
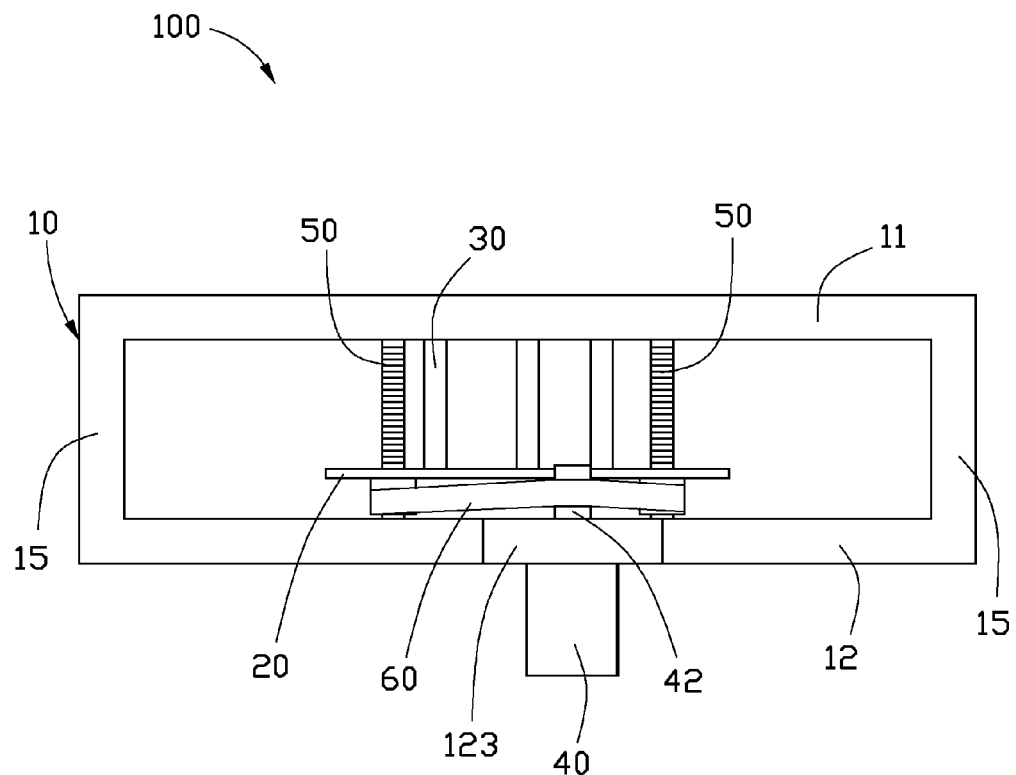
FIG. 3 is a front plan view of the ejection mechanism of FIG. 1, but showing the ejection mechanism before ejection.

FIG. 3 is a schematic view of the ejection mechanism 100 before ejection. The ejector plate 20 is in a position nearest to the second plate 20, so that the ejectors 30 are retracted at an initial position.

Figure 4:
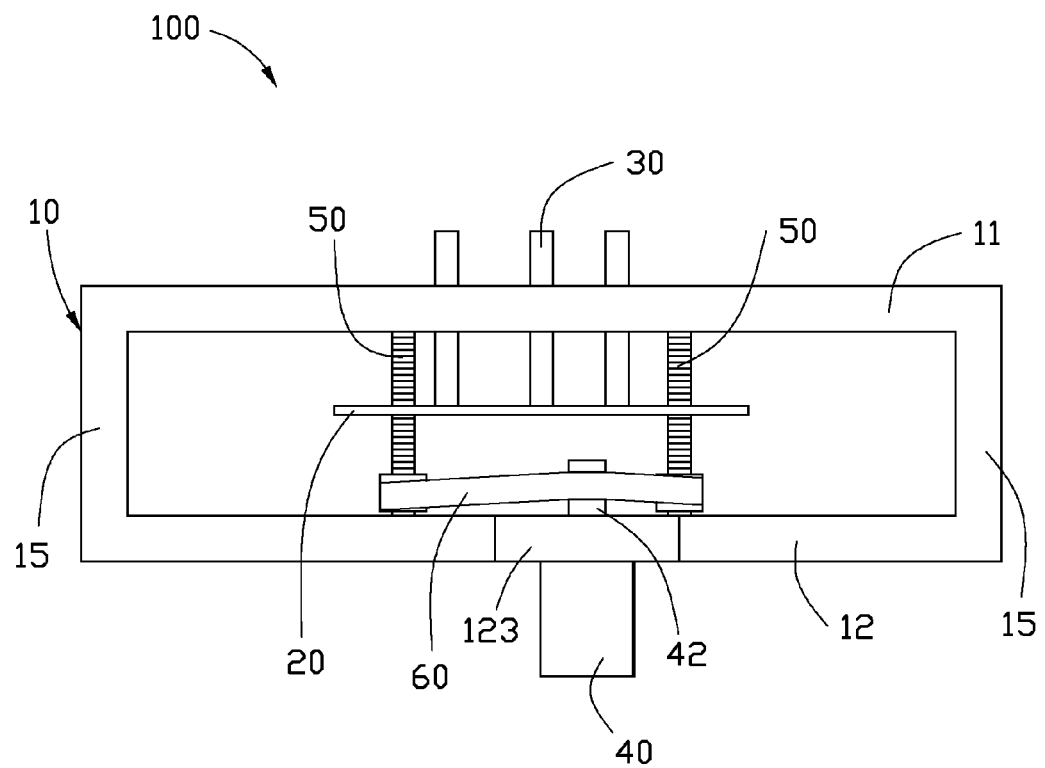
FIG. 4 is similar to FIG. 3, but showing the ejection mechanism during ejection.

FIG. 4 is a schematic view of the ejection mechanism 100 during ejection. The ejector plate 20 is driven up toward the first plate 11 by the actuator 40, and the ejectors 30 protrude up beyond a top of the first plate 11.

Figure 5:
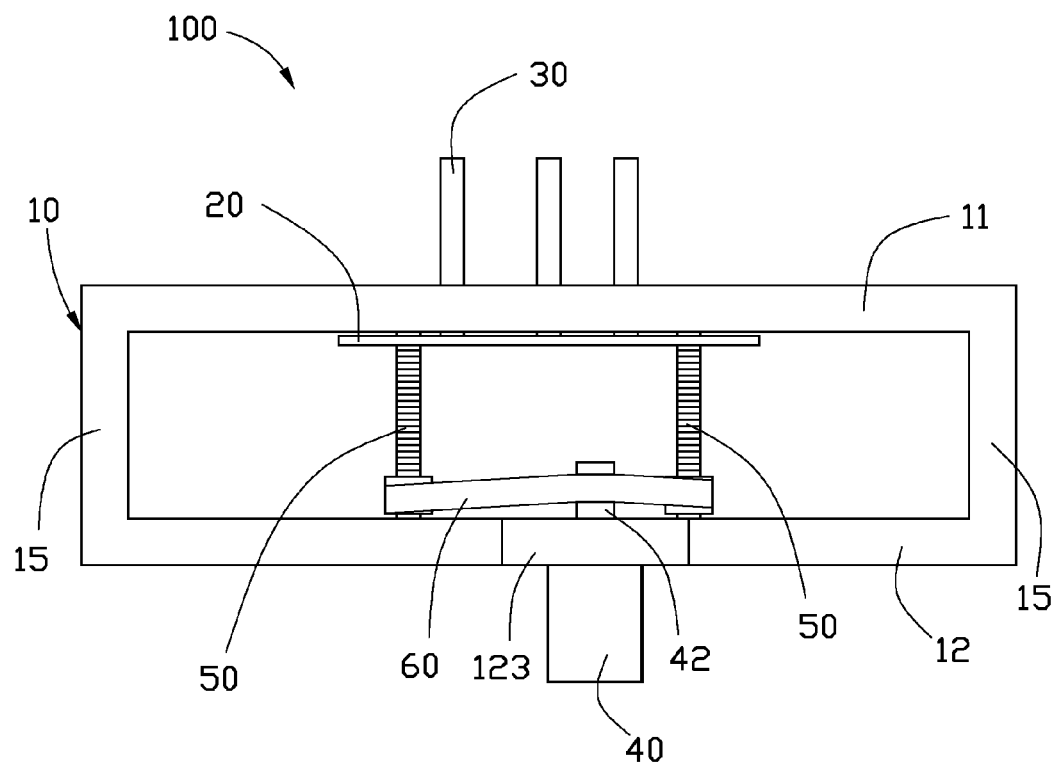
FIG. 5 is similar to FIG. 4, but showing the ejection mechanism after ejection.

FIG. 5 is a schematic view of the ejection mechanism 100 after ejection. The ejector plate 20 is in a position nearest to the first plate 11, and the ejectors 30 have reached a position of maximum protrusion beyond the top of the first plate 11, whereby the ejectors 30 achieve ejection of a molded article (not shown).

When the actuator 40 drives the ejector plate 20 from the position nearest the first plate 11 back toward the second plate 12, the ejectors 30 retract gradually back to the initial position.

Referring to FIG. 6, a mold 200 in accordance with a second embodiment comprises a movable mold half 270, a stationary mold half 280, and the ejection mechanism 100.

The movable mold half 270, the stationary mold half 280, and the ejectors 30 of the ejection mechanism 100 together form a mold chamber 290. The ejection mechanism 100 is detachably fixed on the stationary mold half 280 by appropriate fasteners (not shown) extending through the first fixing holes 111 of the first plate 11. The first through holes 14 and the second through hole 21 of the ejection mechanism 100 align with the injection nozzle. The injection nozzle injects molten plastic into the mold chamber 290 through a gate 295.

The ejectors 30 of the ejection mechanism 100, driven by the actuator 40, eject a molded article from the stationary mold half 280. After cleaning the mold chamber 290, the mold 200 is fixed at the second fixing holes 121 of the second plate 12 to prepare for subsequent molding.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An ejection mechanism comprising:
   a first plate defining a first through hole and at least one ejector hole;
   a second plate opposite to the first plate, the second plate defining another first through hole;
   an ejector plate between the first plate and the second plate, the ejector plate defining a second through hole coaxial with the first through holes, and comprising at least one ejector slidably received in the at least one ejector hole;
   an actuator comprising a driving shaft; and
   a drive mechanism between the first plate and the second plate, the drive mechanism comprising two threaded posts and a belt, the two threaded posts substantially parallel to the at least one ejector, wherein one end of each threaded post connects to the drive shaft of the actuator directly through the belt, the other end of each threaded post is threadedly engaged in the ejector plate, when the threaded posts rotate, the threaded posts drive the ejector plate to move between the first plate and the second plate.

2. The ejection mechanism of claim 1, wherein the actuator is arranged on one side of the second plate away from the first plate, and the drive shaft extends through the second plate and connects with the drive mechanism, with the drive shaft being substantially parallel to the at least one ejector.

3. The ejection mechanism of claim 1, further comprising two connecting plates arranged opposite to each other and interconnecting the first plate and the second plate.

4. A mold comprising:
   a stationary mold half;
   a movable mold half; and
   an ejection mechanism comprising:
      a first plate defining a first through hole and at least one ejector hole;
      a second plate opposite to the first plate, the second plate defining another first through hole;
      an ejector plate between the first plate and the second plate, the ejector plate defining a second through hole coaxial with the first through holes, and comprising at least one ejector slidably received in the at least one ejector hole;
      an actuator comprising a driving shaft; and
      a drive mechanism between the first plate and the second plate, the drive mechanism comprising two threaded posts and a belt, the two threaded posts substantially parallel to the at least one ejector, wherein one end of each threaded post connects to the drive shaft of the actuator directly through the belt, the other end of each threaded post is threadedly engaged in the ejector plate, when the threaded posts rotate, the threaded posts drive the ejector plate to move between the first plate and the second plate.

5. The mold of claim 4, wherein the first through hole and the second through hole match with an injection nozzle.

6. The mold of claim 4, wherein the actuator is arranged on one side of the second plate away from the first plate, and the drive shaft extends through the second plate and connects with the drive mechanism, with the drive shaft being substantially parallel to the at least one ejector.

7. The mold of claim 4, wherein the first plate of the ejection mechanism further comprises a first fixing hole for fixing the ejection mechanism on one side of the stationary mold half away from the movable mold half.

8. The mold of claim 4, wherein the actuator is a motor capable of rotation.

9. An ejection mechanism comprising:
   a first plate defining a first through hole and a plurality of ejector holes;
   a second plate opposite to the first plate, the second plate defining another first through hole;
   an ejector plate between the first plate and the second plate, the ejector plate defining a second through hole coaxial with the first through holes, and comprising a plurality of ejectors slidably received in the ejector holes;
   an actuator comprising a driving shaft; and
   a drive mechanism between the first plate and the second plate, the drive mechanism comprising:
      a plurality of threaded posts threadingly and movably engaged with the ejector plate; and
      a belt, one end of each threaded post connecting to the drive shaft of the actuator directly through the belt, the other end of each threaded post threadedly engaged in the ejector plate, such that the driving shaft is capable of driving the threaded posts to rotate whereby the ejector plate moves up or down as desired and ends of the ejectors correspondingly extend out from or retract back into the first plate.

10. The ejection mechanism of claim 9, wherein the actuator is arranged on one side of the second plate away from the first plate, and the drive shaft extends through the second plate and connects with the drive mechanism, with the drive shaft being substantially parallel to the at least one ejector.

11. The ejection mechanism of claim 9, further comprising two connecting plates arranged opposite to each other and interconnecting the first plate and the second plate.

* * * * *